(12) United States Patent
Duncan et al.

(10) Patent No.: US 7,099,978 B2
(45) Date of Patent: Aug. 29, 2006

(54) METHOD AND SYSTEM OF COMPLETING PENDING I/O DEVICE READS IN A MULTIPLE-PROCESSOR COMPUTER SYSTEM

(75) Inventors: Samuel H. Duncan, Arlington, MA (US); Andrej Kocev, Lunenburg, MA (US); David T. Mayo, Boxborough, MA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 226 days.

(21) Appl. No.: 10/662,782

(22) Filed: Sep. 15, 2003

(65) Prior Publication Data

US 2005/0060473 A1  Mar. 17, 2005

(51) Int. Cl.
*G06F 13/32* (2006.01)
*G06F 13/24* (2006.01)
(52) U.S. Cl. .................. 710/266; 710/263; 710/59
(58) Field of Classification Search ............ 710/48–59, 710/266, 263
See application file for complete search history.

(56) References Cited

U.S. PATENT DOCUMENTS

| | | | | |
|---|---|---|---|---|
| 5,252,507 A | * | 10/1993 | Hively et al. | 438/6 |
| 5,367,695 A | * | 11/1994 | Narad et al. | 709/210 |
| 5,440,747 A | * | 8/1995 | Kiuchi | 710/267 |
| 5,875,343 A | * | 2/1999 | Binford et al. | 710/263 |
| 5,884,088 A | * | 3/1999 | Kardach et al. | 713/324 |
| 6,166,748 A | * | 12/2000 | Van Hook et al. | 345/522 |
| 6,253,275 B1 | * | 6/2001 | Waldron et al. | 710/260 |
| 6,625,679 B1 | * | 9/2003 | Morrison et al. | 710/260 |

OTHER PUBLICATIONS

PCI Local Bus Specification, Revision 2.3, Mar. 29, 2002, PCI Special Interest Group (328 pp.).

* cited by examiner

*Primary Examiner*—Rehana Perveen
*Assistant Examiner*—Jeremy S. Cerullo

(57) ABSTRACT

A method and system for completing pending I/O device reads by periodically stalling the issuance of I/O device accesses by a program in a multiple-processor computer system.

20 Claims, 3 Drawing Sheets

METHOD AND SYSTEM OF COMPLETING PENDING I/O DEVICE READS IN A MULTIPLE-PROCESSOR COMPUTER SYSTEM

BACKGROUND

Consider for purposes of explanation a computer system having at least two processors coupled together, and each processor coupled to its own bridge device. Each bridge device may couple one or more input/output (I/O) devices to each processor. Programs executing on the processors may need to read and write data to the I/O devices. While I/O device writes may always be consumed (completed) by the I/O devices, completion of an I/O device read may be more complicated.

Before an I/O device read may complete, all writes to the I/O device posted earlier in time may need to be completed. Further, an I/O device read may result in the return of data to the requesting device, and therefore there may need to be bus bandwidth available in which to return the requested information. Further, before the I/O device read data may be returned to the requesting device, all writes issued by any device on the same side of the I/O bridge may need to be completed.

If forward progress of I/O device writes is not guaranteed then it is possible for a system to deadlock. In systems where the completion of an I/O read on one side of a bridge depends on the completion of writes issued earlier in time (as is true for all PCI buses), write requests must be guaranteed to complete. To guarantee that write requests complete they must be allowed to pass I/O read requests that may have been issued earlier in time.

Thus, computer system and processor designers may invoke a rule that I/O device writes may pass I/O device reads in the queue. This rule may mean that I/O device writes posted later in time may complete before I/O device reads posted earlier in time. This rule may avoid the circular dependency problem by clearing I/O device writes, and therefore clearing bus bandwidth, behind the I/O device reads. However, in large systems and/or computationally intensive systems, the rule that I/O device writes may pass I/O device reads may lead to read starvation because of a continuous stream of I/O device writes. That is, an I/O device read may not get the opportunity to complete because of a continuous stream of later posted I/O device writes filling the available communication bandwidth between the bridge and the processor and passing the I/O device read.

SUMMARY

The problems noted above are solved in large part by a method and system for completing pending I/O device reads in a multiple-processor computer system. One exemplary embodiment may be a method comprising periodically stalling issuance of input/output (I/O) device accesses by a program in a multiple-processor computer system, and during the stalling step completing pending I/O device reads.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. The embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
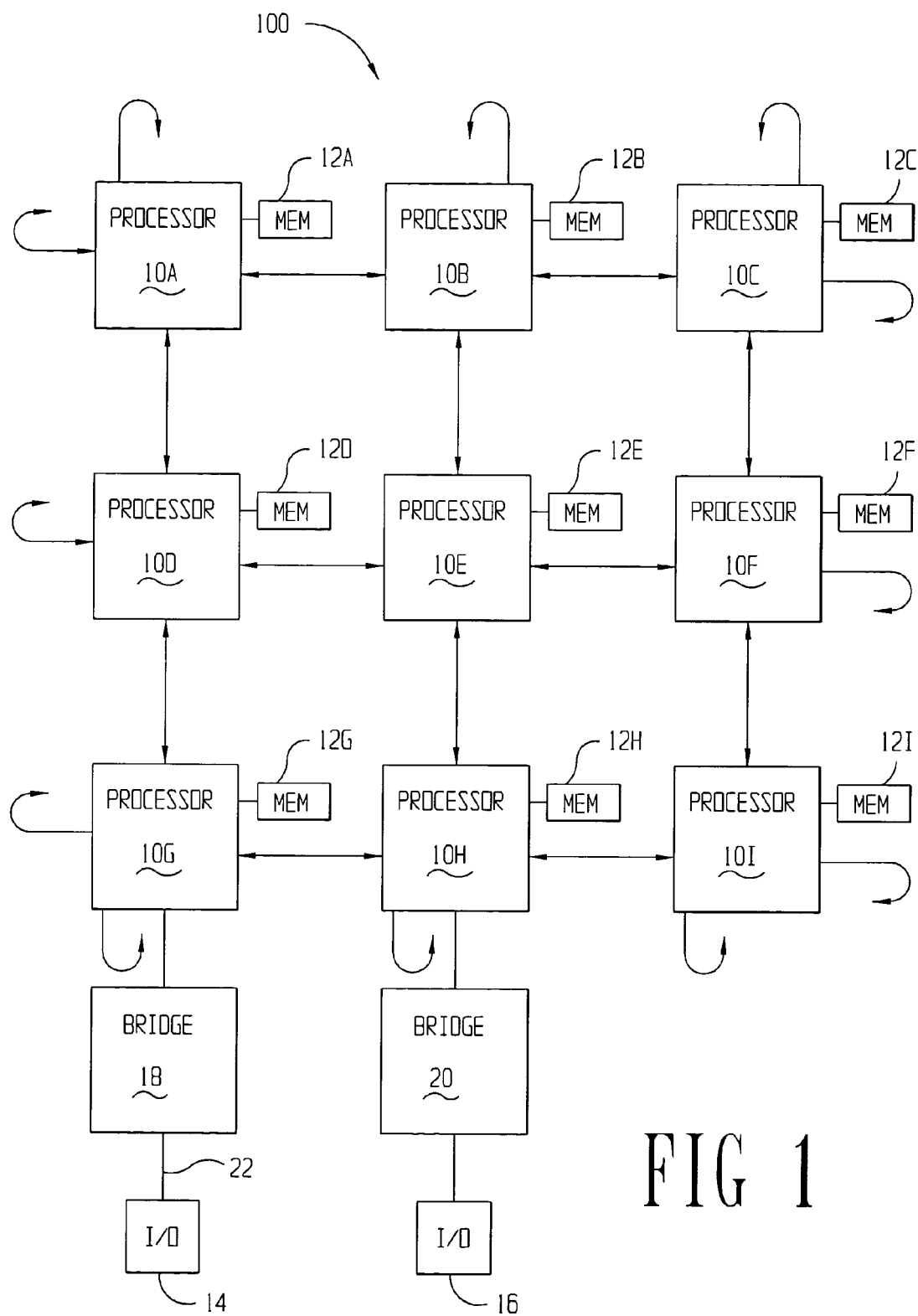
FIG. 1 illustrates a computer system constructed in accordance with embodiments of the invention.

FIG. 1 illustrates a computer system 100 constructed in accordance with embodiments of the invention. The computer system 100 may comprise two or more processors 10 coupled together in any suitable manner, such as a Manhattan grid architecture. Although computer system 100 shows nine processors, any number of processors, e.g., 256, may be used. As discussed more thoroughly below, each processor 10 may comprise a port or router logic (not specifically shown in FIG. 1), which enables the processor to couple to at least four other processors. The ports for connecting to other processors, or inter-processor ports, may for convenience be designated as North, South, East and West. Thus, an exemplary processor 10A may couple on its North port to processor 10G, may couple on its West port to processor 10C, may couple on its South port to processor 10D, and may couple on its East port to processor 10B. Thus, at least some embodiments may use a distributed router system. In alternative embodiments of the invention, a central router, switch, bus, or other mechanism for coupling processors, memories and bridges to I/O devices may be used.

Still referring to FIG. 1, each processor 10 may have an associated memory device or devices 12 coupled thereto, which may be referred to as local memory. Thus, at least some embodiments of the invention may be multiple processor computer systems operated under an architecture known as the non-uniform memory access (NUMA) model. The memory 12 coupled to each processor may be available to any program executing on any processor 10 in the computer system 100; however, accesses to non-local memory may incur a performance penalty. In accordance with at least some embodiments of the invention, each memory device 12 may comprise a RAM bus™ memory device or devices, but other memory devices may be equivalently used.

In addition to coupling to other processors in the computer system, at least some of the processors in accordance with embodiments of the invention may couple to a bridge device. For example, exemplary processor 10G may couple to bridge device 18. Exemplary processor 10H may couple to bridge device 20. Each bridge device may bridge an expansion bus, of various possible types, to its respective processor. Thus, expansion bus 22 may be, for example, a Peripheral Components Interconnect (PCI) bus, a PCI-X bus, an Advanced Graphics Port (AGP) bus, or any other now available or later-developed expansion bus. The I/O devices 14, 16 may be any I/O device, such as a network interface card.

In order to avoid cyclic dependencies and deadlock, the computer system 100, in particular the bridge devices 14, 16, may implement ordering rules with respect to processor or I/O device reads directed at an I/O device, and processor or I/O device writes directed at an I/O device. Writes directed at an I/O device posted later in time may pass reads directed at an I/O device posted earlier in time. Thus, though a read from an I/O device may be in a penultimate buffer position (not specifically shown) in a bridge device, other writes to an I/O device may assume the ultimate buffer position (not shown) and be placed on an expansion bus prior to the I/O device read. The inventors of the present specification have found, however, that while allowing writes targeting an I/O device to pass reads targeting an I/O device may alleviate the possibility of circular dependencies (and therefore deadlock), a continuous stream of writes targeting an I/O device may starve access of I/O device reads to the expansion bus or channel. This starvation of access may have two components. The first component may be that the stream of I/O device writes may continuously pass the I/O device read. A second aspect of the starvation may be related to the ability to return read data to the requester.

Unlike an I/O device write which does not necessarily require the return of any information, an I/O device read returns a set of data or information to the requestor. Thus, there may need to be sufficient bandwidth in the communication channels between the I/O device and requesting device to return the requested data. In addition, the set of data returned to the read requestor may not be made available before data written by the I/O device into memory has reached a point of coherence. If the computer system, such as computer system 100, generates a continuous supply of I/O device writes to a bridge, an I/O device read in queue within the bridge may be unable to complete for lack of having available bandwidth to return the requested information, for example, bandwidth on the bus between the bridge and its coupled processor. Thus, the second way the continuous stream of I/O device writes may act to starve access of an I/O device read is by consuming all the available bandwidth of at least a portion of the return communication path.

In order to ensure forward progress of I/O device reads, processors in accordance with embodiments of the invention may have the capability of periodically halting or stalling I/O device accesses (writes and/or reads). During a period of time in which the I/O device accesses initiated by the processor are halted or stalled, pending I/O device reads may complete. I/O device writes posted prior to the stall condition may pass any pending I/O device reads. Once the I/O device writes have cleared, the I/O device reads may have access to the expansion bus, and likewise may have bandwidth in a return path for return information.

Figure 2:
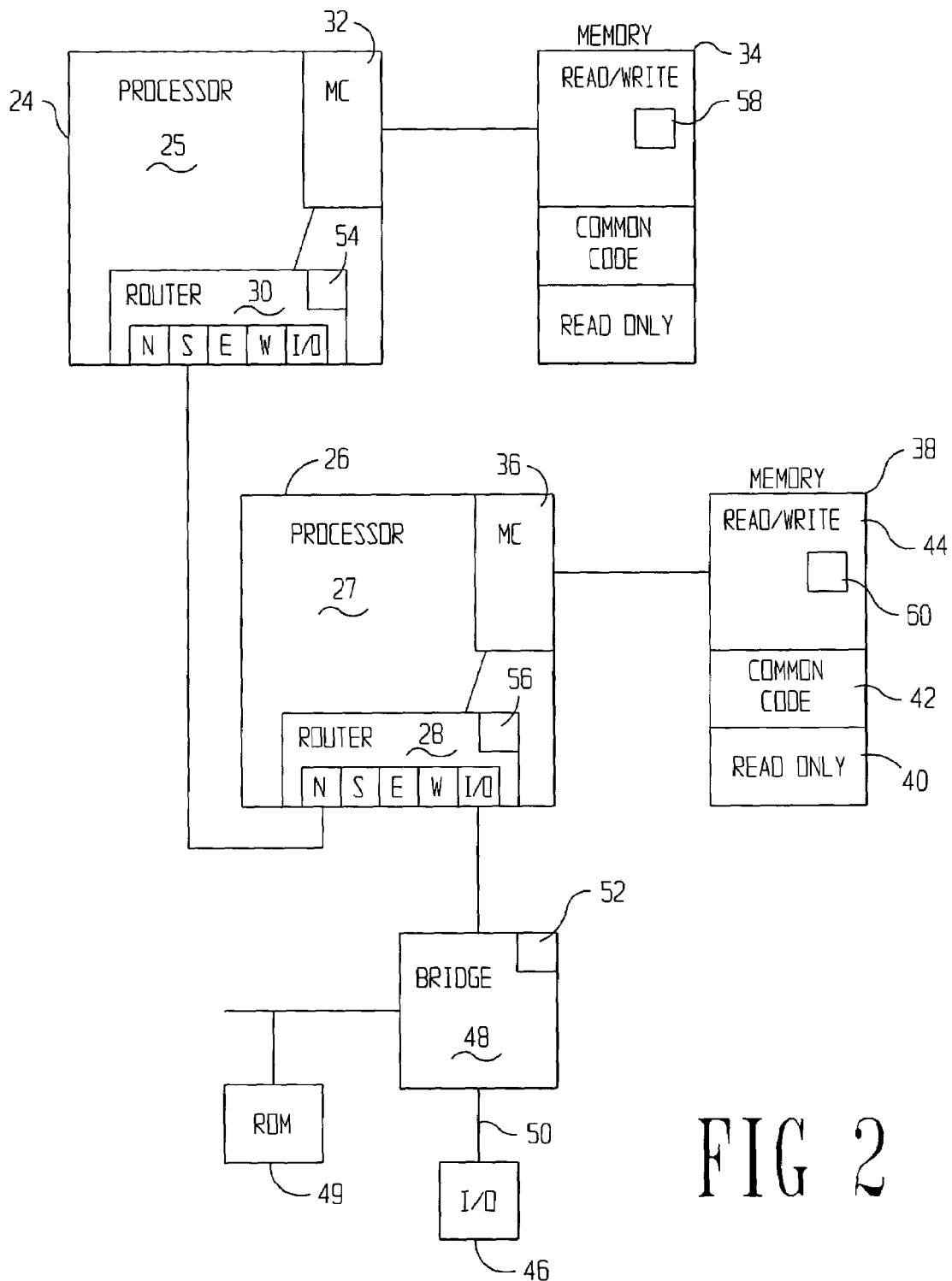
FIG. 2 illustrates, in greater detail, portions of the computer system constructed in accordance with embodiments of the invention.

FIG. 2 illustrates a portion of computer system 100 in greater detail. In particular, FIG. 2 illustrates a first processor 24 coupled to a second processor 26. The processors in FIG. 2 are given different reference numbers for convenience of the discussion, but in accordance with at least some embodiments of the invention the processors 24 and 26, as well as all the processors 10 in FIG. 1, may be identical. Processor 26 may comprise a port or router logic 28 having a plurality of ports, the router logic 28 coupled to the memory controller 32 and a core region 27. Likewise, processor 24 may comprise a port or router logic 30 having a plurality of ports, the router logic 30 coupled to the memory controller 32 and a core region 25. As discussed above, the ports may be North (labeled N in the drawing), South (labeled S in the drawing), East (labeled E in the drawing) and West (labeled W in the drawing). Additionally, the router logic may comprise an I/O port (labeled I/O in the drawings). Each router logic in accordance with embodiments of the invention may have the capability of transferring data received on any port to any other port, and also coupling that data to its respective memory controller and/or core. For communications between processors, where an intervening processor is not the intended recipient, the messages may pass through the router logic without encumbering any other hardware or software executing in the processor. FIG. 2 shows the South port of router 30 in processor 24 coupled to a North port of router 28 in processor 26. In at least some embodiments of the invention, additional processors would be present, and the additional processors would be coupled by way of the ports of the router logic. These additional processors are not shown in FIG. 2 so as not to unduly complicate the drawing.

FIG. 2 also illustrates in greater detail various portions of memory coupled to each of the processors. In particular, each processor may have a memory controller which controls accesses to attached memory. Thus, processor 24 may comprise memory controller 32 coupled to memory 34, which memory may form the local memory of processor 24. Likewise, processor 26 may comprise a memory controller 36 coupled to memory 38, which memory may form the local memory processor 26.

The memory coupled to each processor, in accordance with embodiments of the invention, may have a plurality of areas with different designations. In particular, a portion of the memory may be designated read-only, such as read-only area 40 of memory 38. All of memory 38 may be accessible and writable, but for convenience a portion of that memory may be designated as read-only. This portion of otherwise writable memory designated as read-only should not be confused with read-only memory (ROM) (such as an electrically erasable programmable read-only memory (EEPROM)). The read-only memory area 40 may comprise processor-specific information, such as page sizes, a designation of local memory, and a processor identification number. Memory attached to each processor may further comprise a common code portion, such as common code portion 42 of memory 38. In accordance with embodiments of the invention, when the computer system is booted, programs may be copied or replicated from non-volatile memory, such as read-only memory (ROM) 49, to each common code portion of each memory. Replicated programs may be, for example, low level operating system programs and basic input/output system (BIOS) routines, and may be referred to as firmware. Thus, each processor may access and execute firmware programs from its local memory, rather than attempting to execute the programs from non-local memory or from the non-volatile memory locations.

Finally, each memory may comprise a read/write area, such as read/write area 44 of memory 38. Read/write area 44 may store user programs and data, and may be the primary working area for each attached processor.

Still referring to FIG. 2, consider for purposes of explanation that processors 24 and 26 (or the user programs executing on those processors) are issuing a stream of writes to the I/O device 46. Further consider that at least one I/O device read has also been issued by one or both of the processors 24, 26. As for processor 26, the I/O device writes (and possibly the I/O device read) may propagate to the bridge device 48 through the I/O port of the router logic 28. Likewise, processor 24 may direct I/O device writes (and possibly I/O device reads) to the I/O device 46 through the South port of router logic 30 into the North port of router logic 28. Router logic 28 may thus couple the request to its I/O port and onto the bridge device 48. Because of the assumed stream of I/O device writes, any I/O device reads within buffers (not shown) of the bridge device 48 may not have an opportunity to be placed on the secondary expansion bus 50. As has been previously discussed, this inability or starvation may be caused by I/O device writes continually passing the buffered I/O device reads, and also possibly based on a lack of communication bandwidth for message transfers from the bridge device 48 to the router logic 28 (and likewise from the router logic 28 to the router logic 30).

In order to ensure that I/O device reads have an opportunity to make forward progress, the processors in a computer system in accordance with embodiments of the invention may periodically stall or halt some or all I/O device accesses in order to allow pending I/O device reads to complete. This stall or halt may be accomplished by having some or all processors in the computer system enter an interrupt mode, in which state firmware programs may be executed. While in this interrupt state, the issuance of at least I/O device writes may cease from each processor, thus giving I/O device reads an opportunity to complete.

A processor constructed in accordance with embodiments of the invention may take a periodic processor interrupt. That is, after passage of a fixed number of timer ticks, the processor may temporarily cease executing its user programs and/or operating system programs, and run programs supplied from firmware, possibly stored in the common code portion of each memory.

Figure 3:
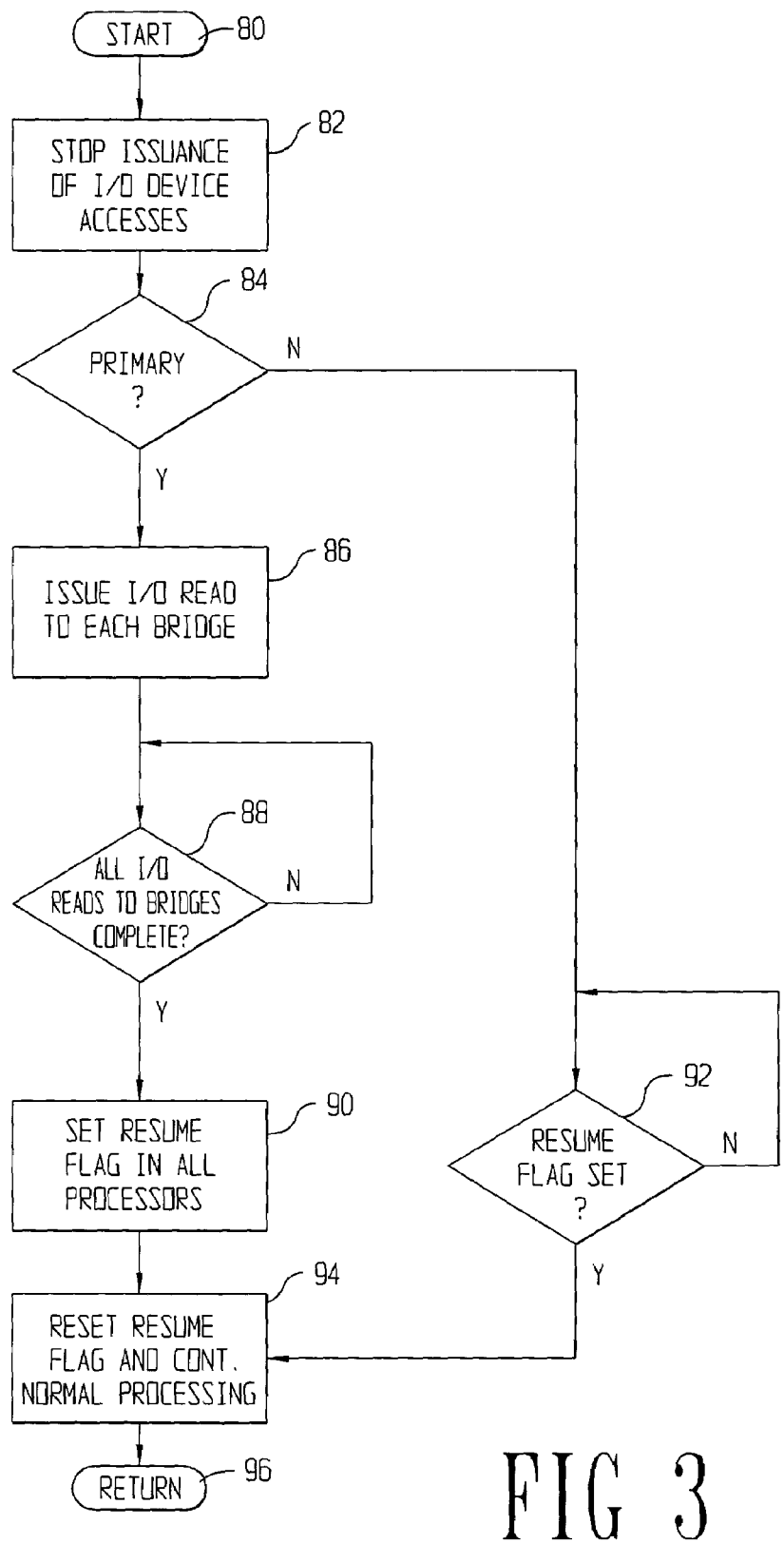
FIG. 3 illustrates a flow diagram of method steps that may be implemented in accordance with embodiments of the invention.

Although the programs in the common code portion of the memory attached to each processor may perform many tasks, FIG. 3 illustrates a flow diagram of the steps associated with implementing various embodiments of the invention. In accordance with embodiments of the invention, each processor in the computer system may, through its replicated firmware in the common code section of its local memory, perform the method steps illustrated in FIG. 3. Though the following discussion is directed to a single processor executing the illustrated method, all or substantially all processors may perform the exemplary steps. The process may start by the processor entering the periodic processor interrupt mode (block 80). In accordance with embodiments of the invention, substantially every processor may enter the periodic processor interrupt mode at substantially the same time. A first step may be to stop or halt the issuance of I/O device accesses (block 82). A next step may be a determination of whether the processor has been designated as the primary processor in the computer system (block 84). This determination may be made by access to the read-only portion of local memory, where a designation of primary may be placed in any suitable form. If the processor determines that it is the primary processor in the computer system, the next step may be issuance of a read to each bridge device in the computer system (block 86). In accordance with embodiments of the invention, the read may be to a scratch register, for example register 52 in bridge 48 of FIG. 2. In alternative embodiments, the read may be an I/O device read.

At this point in the exemplary process, some or all the processors in the computer system may have ceased issuance of I/O device accesses. A single processor may have determined that it has the primary designation, and has issued a read request to each bridge device in the system. I/O device (or bridge) reads queued in any of the bridges of the computer system may thus have an opportunity to complete after the pending I/O device write requests have completed. Stated otherwise, by stopping or stalling the issuance of I/O device accesses from the processors in the computer system (save the primary processor), pending I/O device reads may have an opportunity to execute since they will not be stalled or starved because of write passing or lack of bus bandwidth for transmission of read return information.

Returning to FIG. 3, when the primary processor receives indication that all the bridge device reads have completed (block 88) (indicating that all pending I/O device reads have completed), normal system processing may resume. In order to resume normal processing, the primary processor may set a resume flag or register, or other means for triggering, in all the processors as an indication for those processors to resume normal processing (block 90). Although block 90 indicates that the resume flag may be set, in alternative embodiments it may be reset to indicate the completion of the stall period.

Returning to block 84, if the processor determines that it is not the primary processor in the computer system, then the process may move to a determination of whether its associated resume flag or register has been set (block 92). As was discussed with respect to a processor designated as primary, the resume flag may not be set until pending I/O device reads have been completed. When the resume flag has been set, some or all processors (including the primary processor) may reset the resume flag (block 94) and return to further processing (block 96). In alternative embodiments, the resume flag may be reset contemporaneous with ceasing of the issuance of I/O device accesses.

Returning to FIG. 2, the resume flag or register may be located in many places. In some embodiments of the invention, the resume flag may be within the router logic, for example resume flag 54 in router logic 30 or resume flag 56 in router logic 28. In alternative embodiments of the invention, the resume flag may be in the memory, for example resume flag 58 in memory 34 or resume flag 60 in memory 38. Resume flags placed within router logic may be preferable over resume flags placed in memory as flags within router logic may be accessed with relatively little or no intervention of the remaining processor components.

In alternative embodiments of the invention two flags within each processor may be used. A first flag may be used as an indication that all I/O accesses should cease, and a second flag may be used as an indication that I/O accesses may resume. In such a situation, the code executed upon entry into the periodic interrupt may not stop all I/O accesses immediately, but rather may check the state of one of the flags to determine if a primary processor indicates that such activity should be stopped. In embodiments using two flags, the flags may likewise be placed at any suitable location, such as within routers or within the read/write areas of attached memories.

In accordance with embodiments of the invention, the primary processor, for example processor 26, may write the resume flags associated with each processor in the system sequentially, or a broadcast write may be used. Communications between routers in the system may take place quickly, and thus no appreciable delay between restarting of the various processors may be seen, even on a sequential write of the resume flag. Moreover, because each processor in the system is released to begin I/O accesses substantially simultaneously, each processor may likewise enter the mode where I/O accesses are stopped substantially simultaneously.

The embodiments of the invention discussed to this point implement the functionality of ceasing accesses, determining primary status, and the other related steps, using programs implemented within the firmware code. In alternative embodiments, an operating system may be modified to perform the same functions. However, by implementing the techniques to ensure forward progress of the I/O device reads in firmware, it may be possible to use off-the-shelf operating systems for the computer system 100.

The above discussion is meant to be illustrative of the principles and various embodiments of the present invention. Numerous variations and modifications will become apparent to those skilled in the art once the above disclosure is fully appreciated. For example, while the embodiments discussed above may stall issuance of I/O device accesses from all processors, in alternative embodiments only a select number of processors may be stalled, and this stall may be sufficient to allow pending I/O device reads to complete. Further, the exemplary steps illustrated in FIG. 3 may be performed in a different order without departing from the scope and spirit of the invention. Further, some steps may be deleted and other steps added without departing from the scope and spirit of the invention. It is intended that the following claims be interpreted to embrace all such variations and modifications.

What is claimed is:

1. A method comprising:
    periodically stalling issuance of input/output (I/O) device accesses by a program in a multiple-processor computer system by entering an interrupt mode by each processor in the multiple-processor system; and during the stalling step completing pending I/O device reads.

2. The method as defined in claim 1 wherein entering an interrupt mode further comprises entering the interrupt mode by each of the processors substantially simultaneously.

3. The method as defined in claim 1 wherein after completing pending I/O device reads, the method further comprises allowing each processor in the multiple-processor to resume issuing I/O device accesses.

4. A method comprising:
    periodically stalling issuance of input/output (I/O) device accesses by a program in a multiple-processor computer system;
    completing pending I/O device reads during the stalling issuance of I/O device accesses; and then
    allowing each processor in the multiple-processor to resume issuing I/O device accesses by asserting a resume flag associated within each processor by a processor designated as primary.

5. The method as defined in claim 4 wherein asserting a resume flag further comprises asserting a resume flag in a port logic of each of the processors.

6. The method as defined in claim 4 wherein asserting a resume flag further comprises asserting a resume flag in a read/write portion of a memory coupled to each of the processors.

7. A computer system comprising:
    a plurality of processors coupled to each other;
    at least one of the plurality of processors coupled to an input/output (I/O) device by way of a bridge logic device; and
    wherein each of the plurality of processors periodically executes a program that operates to cease issuance of I/O device writes until pending I/O device reads complete.

8. A computer system comprising:
    a plurality of processors coupled to each other;
    at least one of the plurality of processors coupled to an input/output (I/O) device by way of a bridge logic device;
    a plurality of flag registers associated one each with the plurality of processors; and
    wherein each of the plurality of processors periodically executes a program that operates to cease issuance of I/O device writes until pending I/O device reads complete, and wherein at least some of the plurality of processors resume issuance of I/O device writes upon assertion of their associated flag registers.

9. The computer system as defined in claim 8 wherein each flag register is external to each processor.

10. The computer system as defined in claim 9 further comprising:
    a plurality of memory devices coupled one each to at least some of the plurality of processors;
    wherein each flag register is in a local memory of each processor.

11. The computer system as defined in claim 8 wherein each flag register is internal to each processor.

12. The computer system as defined in claim 11 wherein each processor further comprises a port logic, and wherein the flag register is located within the port logic.

13. A method comprising:
    a plurality of processors coupled to each other, one of the plurality of processors designated a primary processor; and
    at least one of the plurality of processors coupled to an input/output (I/O) device by way of a bridge logic device;
    wherein each of the plurality of processors periodically executes a program that operates to cease issuance of I/O device writes until pending I/O device reads complete; and
    wherein the primary processor is programmed to issue a read to the bridge logic device after cessation of I/O device writes, and wherein when the read to the bridge device completes the primary processor is further programmed to allow the computer system to resume issuance of I/O device writes.

14. A processor comprising:
    a core region;
    a memory controller; and
    a port logic coupled to the core region and the memory controller, the port logic comprising register;
    wherein the processor periodically enters an interrupt mode, and during the interrupt mode the processor executes firmware that operates to stop production of input/output (I/O) device write requests, and wherein the processor exits the interrupt mode and resumes production of I/O device writes when the register is asserted.

15. A processor comprising:
    a core region;
    a memory controller; and a port logic coupled to the core region and the memory controller, wherein the processor couples to one or more bus bridges by way of the port logic;

wherein the processor periodically enters an interrupt mode, and during the interrupt mode the processor executes firmware that operates to stop production of input/output (I/O) device write requests; and wherein during the interrupt mode the processor issues read commands to each of the one or more bus bridges if the processor has a primary designation.

16. The processor as defined in claim 15 wherein during the interrupt mode the processor commands other processors to resume production of I/O device write requests if the processor has a primary designation.

17. A computer system comprising:

a plurality of means for executing programs and instructions coupled to each other, each of the plurality of means for executing coupled to a means for storing data and instructions local each of the plurality of means for executing;

at least one of the plurality of means for executing coupled to a means for receiving data from devices external to the computer system and for sending data to device external to the computer system, the means for receiving coupled to the at least one plurality of means for executing by way of a means for bridging a first and second communication bus; and wherein each of the plurality of means for executing periodically executes programs that operate to cease issuance of writes to the means for receiving until pending writes to the means for receiving complete.

18. A computer system comprising:

a plurality of means for executing programs and instructions coupled to each other, each of the plurality of means for executing coupled to a means for storing data and instructions local each of the plurality of means for executing;

at least one of the plurality of means for executing coupled to a means for receiving data from devices external to the computer system and for sending data to device external to the computer system, the means for receiving coupled to the at least one plurality of means for executing by way of a means for bridging a first and second communication bus; and a plurality of means for triggering associated one each with the plurality of means for executing;

wherein each of the plurality of means for executing periodically executes programs that operate to cease issuance of writes to the means for receiving until pending writes to the means for receiving complete; and wherein at least some of the plurality of means for executing resume issuance of writes to the means for receiving upon assertion of their associated means for triggering.

19. The computer system as defined in claim 18 wherein each means for triggering is in the means for storing coupled to each means for executing.

20. The computer system as defined in claim 18 wherein each means for triggering is in its associated means for executing.

* * * * *

UNITED STATES PATENT AND TRADEMARK OFFICE
CERTIFICATE OF CORRECTION

PATENT NO. : 7,099,978 B2
APPLICATION NO. : 10/662782
DATED : August 29, 2006
INVENTOR(S) : Samuel H. Duncan et al.

It is certified that error appears in the above-identified patent and that said Letters Patent is hereby corrected as shown below:

On the face page, in field (73), in "Assignee", in column 1, line 2, delete "LP." and insert -- L.P. --, therefor.

In column 8, line 57, in Claim 14, after "comprising" insert -- a --.

Signed and Sealed this

Thirtieth Day of June, 2009

JOHN DOLL
*Acting Director of the United States Patent and Trademark Office*